(12) United States Patent
Hong

(10) Patent No.: US 9,812,986 B2
(45) Date of Patent: Nov. 7, 2017

(54) APPARATUS FOR BALANCING VOLTAGES OF DC LINK CAPACITOR IN INVERTER

(71) Applicant: LSIS CO., LTD., Gyeonggi-do (KR)

(72) Inventor: Ii-Pyo Hong, Gyeonggi-do (KR)

(73) Assignee: LSIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/400,595

(22) Filed: Jan. 6, 2017

(65) Prior Publication Data

US 2017/0288573 A1  Oct. 5, 2017

(30) Foreign Application Priority Data

Mar. 29, 2016  (KR) .......... 10-2016-0037389

(51) Int. Cl.
*H02M 7/487* (2007.01)

(52) U.S. Cl.
CPC .................. *H02M 7/487* (2013.01)

(58) Field of Classification Search
CPC .......... H02H 7/12; H02H 7/16; H02H 7/1206; H02M 7/487; H02M 7/483; H02M 7/48; H02M 7/75
USPC ............................. 363/28; 307/110
See application file for complete search history.

(56) References Cited

U.S. PATENT DOCUMENTS

| | | | |
|---|---|---|---|
| 4,805,063 A * | 2/1989 | Kataoka | G01R 31/028 324/548 |
| 6,738,277 B2 * | 5/2004 | Odell | H02J 7/0016 363/143 |
| 8,971,069 B2 * | 3/2015 | Dunipace | H02M 1/36 361/328 |
| 8,975,899 B2 * | 3/2015 | Wolf | H02M 7/48 324/519 |
| 9,110,479 B2 * | 8/2015 | Shibata | H02M 1/32 |
| 9,252,672 B2 * | 2/2016 | Wu | H02M 3/33507 |
| 9,647,565 B2 * | 5/2017 | Cardu | H02M 3/33507 |

(Continued)

FOREIGN PATENT DOCUMENTS

| | | |
|---|---|---|
| CN | 103337955 A | 10/2013 |
| EP | 2099117 A2 | 9/2009 |

(Continued)

OTHER PUBLICATIONS

Extended European Search Report dated May 31, 2017 corresponding to application No. 16201182.9-1809.

(Continued)

*Primary Examiner* — Kyle J Moody
(74) *Attorney, Agent, or Firm* — Nath, Goldberg & Meyer; Jerald L. Meyer

(57) ABSTRACT

An apparatus for balancing a voltage of a direct current (DC) link capacitor of an inverter is provided. The apparatus of the present disclosure includes a switching unit connected to a node (a reference point) between the first and second resistors, which are connected in series to each other, and a node (a neutral point) between the first and second capacitors, which are connected in series to each other, and configured to short and open between the reference point and the neutral point, and a control unit configured to control the switching unit to short between the reference point and the neutral point when a voltage of the reference point (a reference point voltage) and a voltage of the neutral point (a neutral point voltage) are different from each other.

5 Claims, 5 Drawing Sheets

(56) References Cited

U.S. PATENT DOCUMENTS

| | | | |
|---|---|---|---|
| 2004/0246042 A1 | 12/2004 | Yang | |
| 2007/0291522 A1* | 12/2007 | Toba | H02H 7/1225 363/132 |
| 2009/0261782 A1 | 10/2009 | Morita | |
| 2011/0062962 A1 | 3/2011 | Wolf et al. | |
| 2017/0099002 A1* | 4/2017 | Trevisan | H02M 1/08 |
| 2017/0207709 A1* | 7/2017 | Cardu | H02M 1/083 |

FOREIGN PATENT DOCUMENTS

| | | |
|---|---|---|
| EP | 2760103 A1 | 7/2014 |
| JP | H0564461 A | 3/1993 |
| JP | H06165496 A | 6/1994 |
| JP | H9-37563 A | 2/1997 |
| JP | H10-94260 A | 4/1998 |
| JP | 2002-325461 A | 11/2002 |
| JP | 2008-92791 A | 4/2008 |
| JP | 2009-164875 A | 7/2009 |
| JP | 2010183752 A | 8/2010 |
| JP | 2011-234507 A | 11/2011 |

OTHER PUBLICATIONS

Japanese Notice of Allowance dated on Jun. 6, 2017 corresponding to application No. 2016-234570.

\* cited by examiner

APPARATUS FOR BALANCING VOLTAGES OF DC LINK CAPACITOR IN INVERTER

CROSS REFERENCE TO RELATED APPLICATION

This application claims the benefit of Korean Patent Application No. 10-2016-0037389, filed on Mar. 29, 2016, entitled "APPARATUS FOR VOLTAGE BALANCING FOR DC LINK CAPACITOR IN INVERTER", which is hereby incorporated by reference in its entirety into this application.

BACKGROUND

1. Technical Field

The present disclosure relates to an apparatus for balancing voltages of a direct current (DC) link capacitor of an inverter.

2. Description of the Related Art

Generally, an inverter is an apparatus for receiving an alternating current (AC) power, rectifying the AC power into direct current (DC) power, and outputting AC power having a desired frequency and a desired magnitude. At this point, a smoothing electrolytic capacitor is connected to a DC link of a rectification unit of the inverter.

When an inverter is a type having an input voltage of 400V, a voltage being charged at an electrolytic capacitor of a smoothing unit is about 500V to 800V. However, because a rated voltage of a conventional electrolytic capacitor is 400V, when a smoothing unit of an inverter having an input voltage of 400V is designed, an equivalent rated voltage of the smoothing unit is designed to have 800Vdc by connecting electrolytic capacitors in series.

FIG. 1 is a configuration diagram for describing a conventional inverter.

A smoothing unit 200 is configured with electrolytic capacitors 210, 220, 230, and 240 for smoothing AC power rectified by a rectification unit 100, and voltage divider resistors 215, 225, 235, and 245 which are connected in parallel to the electrolytic capacitors 210, 220, 230, and 240, respectively, and a voltage charged in the smoothing unit 200 is applied to a switching element (not shown) of an inverter unit 300. At this point, two electrolytic capacitors and two voltage divider resistors are connected in series to each other.

The smoothing unit 200 of such a conventional industrial inverter has a structure in which an electrolytic capacitor and a voltage divider resistor are connected in series and in parallel as shown in FIG. 1 so that a single capacitor is necessary for a single voltage divider resistor. An inverter using a plurality of electrolytic capacitors needs voltage divider resistors corresponding to the number of the electrolytic capacitors so that there are problems in that space for mechanically accommodating the electrolytic capacitors and the voltage divider resistors is required and a manufacturing cost is increased as the number of the voltage divider resistors.

Also, a leakage current always occurs at an electrolytic capacitor through a voltage divider resistor so that there is a problem in that efficiency of an inverter is reduced.

Meanwhile, when a voltage of the smoothing unit 200 is not equally applied to capacitors that are connected in series to each other, a voltage over a rated voltage (for example, 400V) may be charged at a specific capacitor. In this case, the capacitor explodes so that there are problems in that an inverter is damaged and also risk of fire is increased due to an electrical spark generated when the capacitor explodes.

SUMMARY

To address the problems described above, an object of the present disclosure is to provide a voltage balancing apparatus capable of equally maintaining voltages at both ends of an electrolytic capacitor without using a voltage divider resistor in a smoothing unit of an inverter.

To attain the object, an apparatus for balancing voltages applied to first and second capacitors according to the present disclosure in an inverter system including a smoothing unit configured with the first and second capacitors which are equivalently connected in series to each other, may include first and second resistors connected in series to each other, wherein the serial connection of the first and second resistors is connected in parallel to the smoothing unit, a switching unit connected to a node (a reference point) between the first and second resistors and a node (a neutral point) between the first and second capacitors and configured to short and open between the reference point and the neutral point, and a control unit configured to control the switching unit to short between the reference point and the neutral point when a voltage of the reference point (a reference point voltage) and a voltage of the neutral point (a neutral point voltage) are different from each other.

The apparatus of one embodiment of the present disclosure may further include a voltage measuring element connected between the reference point and the neutral point.

In one embodiment of the present disclosure, the switching unit may include first and second anti-parallel connected thyristors.

In one embodiment of the present disclosure, the control unit may include an amplification unit configured to amplifying a difference between the reference point voltage and the neutral point voltage, a detection unit configured to detect an output voltage of the amplification unit over a first reference and a second reference which are in a predetermined rage, and an applying unit configured to apply a current controlling the switching unit according to an output of the detection unit.

In one embodiment of the present disclosure, the detection unit may include a first comparator configured to enable the applying unit to apply a current to the switching unit when the output voltage of the amplification unit is greater than the first reference, and a second comparator configured to enable the applying unit to apply the current to the switching unit when the output voltage of the amplification unit is less than the second reference.

In one embodiment of the present disclosure, resistance values of the first and second resistors may be substantially the same to each other.

As described above, the present disclosure is capable of maintaining a balance between voltages of capacitors of the smoothing unit without using a voltage divider resistor at the smoothing unit of an inverter so that a size of the inverter is reduced and an inverter manufacturing cost may be decreased.

Also, a designer may set a voltage difference between a neutral point and a reference point, which determines an operation of the balancing apparatus of the present disclosure, using reference values +REF and −REF of a voltage imbalance detection unit so that there is an effect in which a variety of circuits may be designed as intended by the designer.

Further, in accordance with the present disclosure, a voltage imbalance is designed to be solved through hardware so that there is an effect in which voltages at both ends of a capacitor of the smoothing unit 3 may be adjusted to be balanced without a time delay according to a software process when a voltage imbalance occurs at the smoothing unit 3.

DETAILED DESCRIPTION

Figure 1:
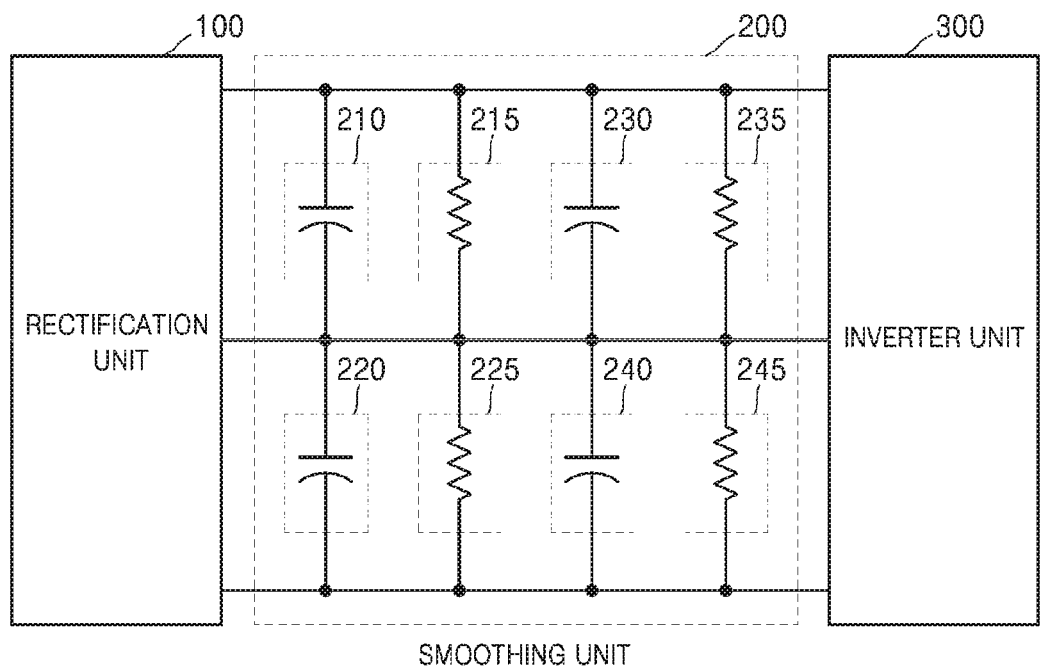
FIG. 1 is a configuration diagram for describing a conventional inverter.

The present disclosure may be variously modified and will have a variety of embodiments so that specific embodiments will be exemplified in the drawings and will be described in detail. The specific embodiments disclosed herein, however, are not to be taken in a sense for limiting the present disclosure to these embodiments, but for explanation thereof and it should be understood that numerous other alternations, equivalents and substituents will be falling within the spirit and scope of the present disclosure.

Hereinafter, one preferred embodiment according to the present disclosure will be described in detail with reference to the accompanying drawings.

Figure 2:
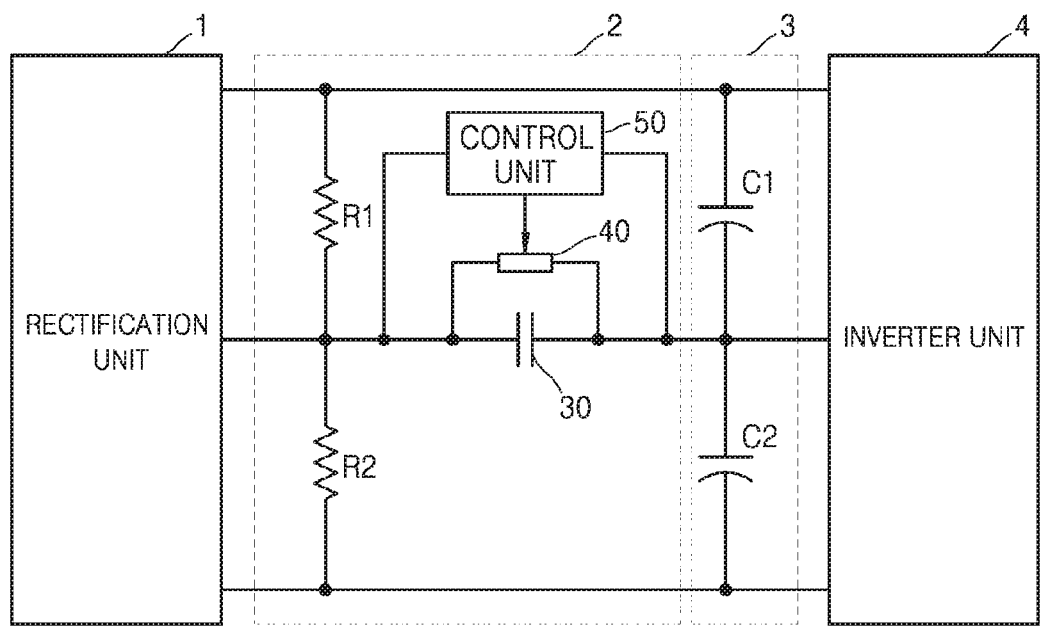
FIG. 2 is a schematic configuration diagram for describing an inverter system according to one embodiment of the present disclosure.

FIG. 2 is a schematic configuration diagram for describing an inverter system according to one embodiment of the present disclosure.

As shown in the drawing, a system of one embodiment of the present disclosure may include a rectification unit 1, a balancing apparatus 2 of the present disclosure, a smoothing unit 3 configured with a first capacitor C1 and a second capacitor C2 which are connected in series to each other, and an inverter unit 4. At this point, the first capacitor C1 and the second capacitor C2 of the smoothing unit 3, which are connected in series, are referred to a 'direct current (DC) link capacitor.'

The rectification unit 1 may rectify a three-phase alternating current (AC) voltage being applied to a DC voltage, and the smoothing unit 3 may smooth the DC voltage. Generally, the inverter unit 4 may output an AC voltage of a predetermined frequency and a predetermined magnitude according to an operation of a switching element to apply the AC voltage to an electric motor (not shown).

In one embodiment of the present disclosure, the smoothing unit 3 in which the first capacitor C1 and the second capacitor C2 are connected in series is exemplified, but the present disclosure is not limited thereto. Therefore, the smoothing unit 3 may be configured with a plurality of electrolytic capacitors being connected to each other, and this may be represented as an equivalent configuration.

Figure 3A:
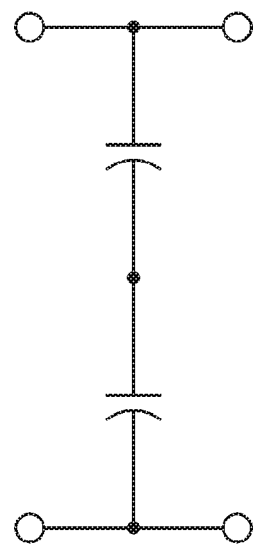
FIGS. 3A and 3B are one exemplary diagram for describing a configuration of a smoothing unit of one embodiment of the present disclosure, respectively.
Figure 3B:
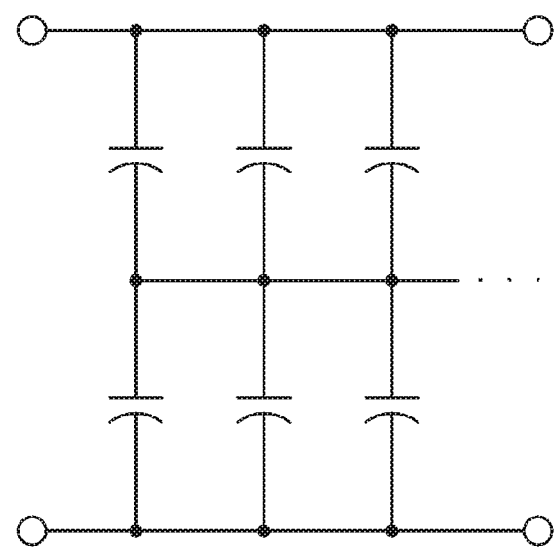

FIGS. 3A and 3B are one exemplary diagram for describing a configuration of the smoothing unit 3 of one embodiment of the present disclosure, respectively.

Here, two electrolytic capacitors may be connected as shown in FIG. 3A, and a connection of the two electrolytic capacitors may be connected in parallel as shown in FIG. 3B. As described above, it should be apparent to those skilled in the art that a configuration shown in FIG. 3B may be equivalently shown as in FIG. 3.

Referring back to FIG. 3, the balancing apparatus 2 of one embodiment of the present disclosure may include a first resistor R1 and a second resistor R2 which are respectively connected in parallel to the smoothing unit 3, a third capacitor 30 for measuring a voltage, a switching unit 40, and a control unit 50 for controlling the switching unit 40.

The first resistor R1 and the second resistor R2 have substantially the same resistance, respectively. In a description of the present disclosure, a node A between the first resistor R1 and the second resistor R is referred to as a 'reference point,' and a voltage of the node A is referred to as a 'reference point voltage.'

The first resistor R1 and the second resistor R2 may be several kilo-ohms (kΩ). As such, resistance values of the first resistor R1 and the second resistor R2 are increased and thus a current flowing through the reference point A is made to be several mill amperes (mA) such that power consumption at the first resistor R1 and the second resistor R2 may be minimized.

Also, a node B between the first capacitor C1 and the second capacitor C2 is referred to as a 'neutral point,' and a voltage of the node B is referred to as a 'neutral point voltage.'

In such a configuration, the third capacitor 30 may measure a voltage between the neutral point B and the reference point A.

In one example of the present disclosure, a capacitor is exemplified as an element for measuring a voltage between a neutral point and a reference point, but it is not limited thereto, a variety of passive or active elements may be used.

The switching unit 40 may be connected in parallel to the third capacitor 30, and may be turned on and off under the control of a control unit 50 to short or open between the reference point and the neutral point.

The switching unit 40 may be, for example, an anti-parallel connected thyristor.

Figure 4:
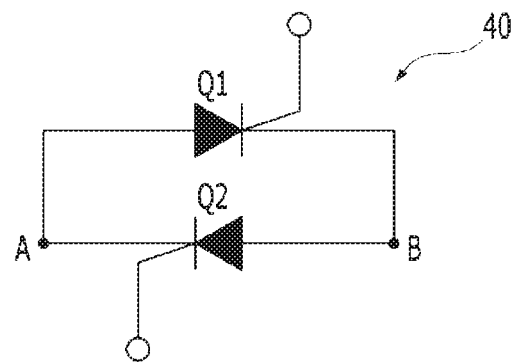
FIG. 4 is a detailed configuration diagram of a switching unit in one embodiment of the present disclosure.

FIG. 4 is a detailed configuration diagram of the switching unit 40 in one embodiment of the present disclosure.

As shown in the drawing, the switching unit 40 of one embodiment of the present disclosure may be configured with, for example, anti-parallel connected thyristors Q1 and Q2. That is, it may be configured such that an anode of the thyristor Q1 is connected to a cathode of the thyristor Q2, and a cathode of the thyristor Q1 is connected to an anode of the thyristor Q2.

A thyristor is a semiconductor device with a four-layer structure of a PNPN junction, and is referred to as a silicon-controlled rectifying device. When an anode is a positive polarity with respect to a cathode, the thyristor may be conducted by a gate current. A configuration of the switching unit 40 in the present disclosure is described by way of exemplifying the thyristor, but the configuration of the switching unit 40 of the present disclosure is not limited to an example of FIG. 4, and it may be configured with a variety of switching elements capable of realizing features of the present disclosure.

The control unit 50 may receive a voltage of the neutral point B and a voltage of the reference point A as an input to control the switching unit 40. In particular, when the switching unit 40 is configured as shown in FIG. 4, the control unit 50 may apply a gate current for conducting the thyristor Q2 when the voltage of the neutral point B is greater than the voltage of the reference point A, whereas it may apply a gate current for conducting the thyristor Q1 when the voltage of the reference point A is greater than the voltage of the neutral point B.

Figure 5:
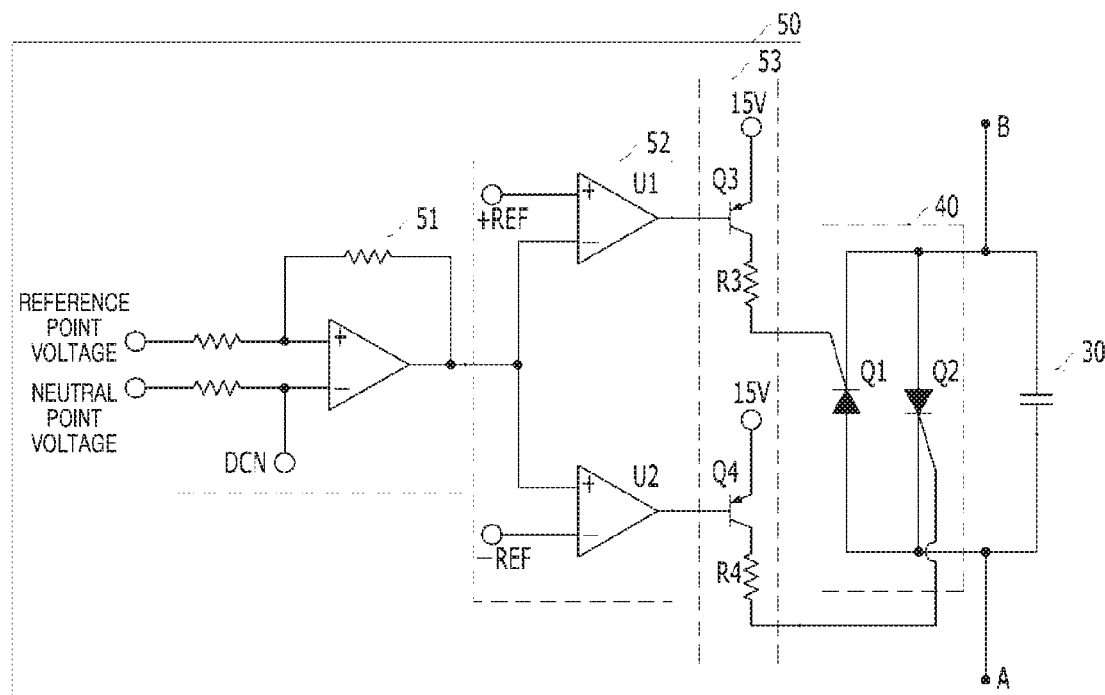
FIG. 5 is a detailed configuration diagram of a control unit in one embodiment of the present disclosure.

FIG. 5 is a detailed configuration diagram of the control unit 50 in one embodiment of the present disclosure.

As shown in the drawing, the control unit 50 of one embodiment of the present disclosure may include a differential amplification unit 51, a voltage imbalance detection unit 52, and a current applying unit 53.

The differential amplification unit 51 may amplify a difference between both ends of the third capacitor 30, that is, a difference between the voltage of the reference point A and the voltage of the neutral point B. The differential amplification unit 51 is configured to include an operational amplifier (OP AMP), and this OP AMP is provided to a misoperation due to noise.

An amplification ratio of the differential amplification unit 51 may be set by a designer, and it may be set according to an amount of a current flowing at a circuit or a magnitude of a voltage applied to the circuit, characteristics of the thyristors Q1 and Q2, and a characteristic of the third capacitor 30.

The voltage imbalance detection unit 52 may verify whether an output voltage of the differential amplification unit 51 is in the range of a positive reference value +REF and a negative reference value—REF. That is, two comparators U1 and U2 are included so that an output of the voltage imbalance detection unit 52 may be applied to the current applying unit 53 when the output voltage is outside the range of the positive reference value +REF and the negative reference value –REF.

The positive reference value +REF and the negative reference value –REF of the voltage imbalance detection unit 52 may be set by the designer, and they may be set according to an amount of a current flowing at a circuit or a magnitude of a voltage applied to the circuit, the characteristics of the thyristors Q1 and Q2, and the characteristic of the third capacitor 30.

The current applying unit 53 may be a PNP transistor having a base connected to an output of each of the comparator U1 and U2, and specifically, a PNP bipolar junction transistor (BJT). Transistors Q3 and Q4 may be connected to resistors R3 and R4, which are provided for a current limitation, respectively. The present disclosure is not limited thereto, and a variety of switching elements may be used in addition to the PNP BJT.

An output of the voltage imbalance detection unit 52 may be applied to a base of the PNP transistor Q3 or Q4 of the current applying unit 53 to turn on or off the transistor Q3 or Q4 such that the thyristor Q1 or Q2 of the switching unit 40 may be controlled.

In the present disclosure, a voltage applied to the transistors Q3 and Q4 of the current applying unit 53 is exemplified as 15V, but it is not limited thereto, and various magnitudes of voltages may be applied according to a configuration of a circuit.

Also, the description of the control unit 50 of the present disclosure is made according to an example in which the switching unit 40 is configured with a thyristor. Therefore, when the switching unit 40 is configured with other element, it will be apparent that the configuration may be changed. That is, when the voltage of the neutral point and the voltage of the reference point are different from each other, it may be possible to implement a variety of configurations capable of controlling the neutral point and the reference point to be shorted.

Hereinafter, an operation of a balancing apparatus of the present disclosure shown in FIGS. 2 to 5 will be described with reference the accompanying drawings.

Figure 6:
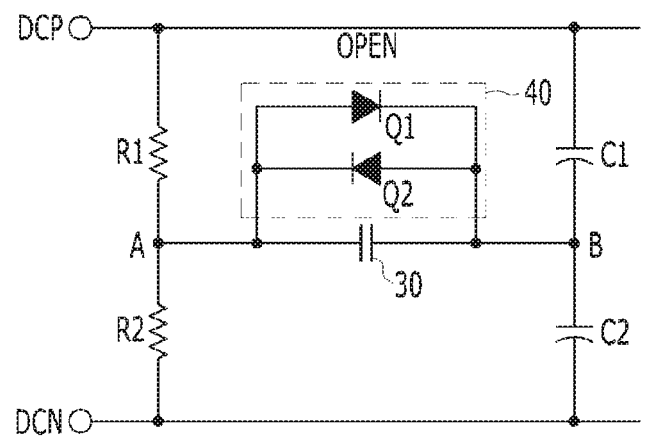
FIGS. 6 to 8 are one exemplary diagram for describing an operation of a balancing apparatus of the present disclosure, respectively.
Figure 7:
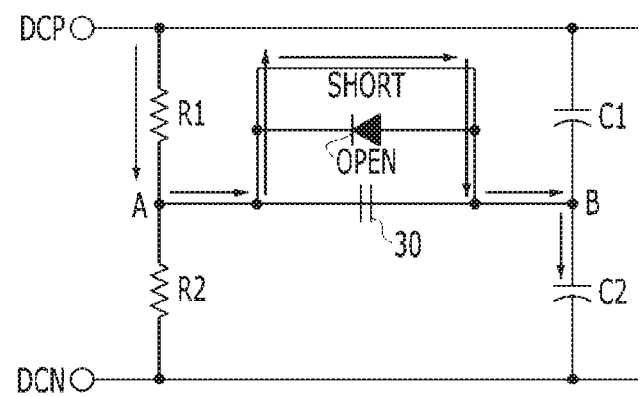
Figure 8:
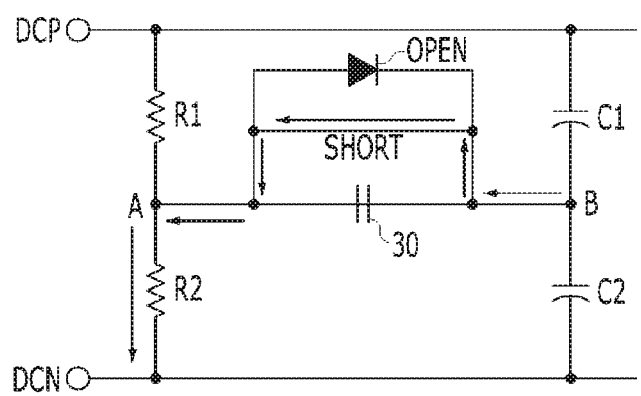

FIGS. 6 to 8 are one exemplary diagram for describing an operation of a balancing apparatus of the present disclosure, respectively.

In particular, FIG. 6 shows a configuration of a circuit when the voltage of the neutral point and the voltage of the reference point are substantially the same to each other, FIG. 7 shows a configuration of the circuit when the voltage of the neutral point is less than the voltage of the reference point, and FIG. 8 shows a configuration of the circuit when the voltage of the neutral point is greater than the voltage of the reference point.

Referring to FIG. 6, when the voltage of the neutral point and the voltage of the reference point are substantially the same to each other, an output of the differential amplification unit 51 is 0 and an output of each of the comparators U1 and U2 in the voltage imbalance detection unit 52 is a HIGH state so that the transistors Q3 and Q4 are maintained in a turn-off state.

In such a case, the thyristors Q1 and Q2 of the switching unit 40 are not conducted such that an OPEN state is maintained between the neutral point and the reference point.

Referring to FIG. 7, when the voltage of the reference point is greater than the voltage of the neutral point, an output voltage of the differential amplification unit 51 becomes a positive value and the positive value is applied to the comparator U1 of the voltage imbalance detection unit 52 to exceed the positive reference value +REF so that an output of the comparator U1 becomes a LOW state to turn on the transistor Q3. With such a process, a current is applied to a gate of the thyristor Q1 of the switching unit 40 and thus the thyristor Q1 is conducted so that a SHORT state is made between the reference point and the neutral point. At this point, the output of the comparator U2 of the voltage imbalance detection unit 52 is still maintained in the HIGH state so that the thyristor Q2 is not conducted.

Through a series of process, a current flows along a path of the first resistor R1, the reference point A, the neutral point B, and the second capacitor C2 such that a voltage may be charged at the second capacitor C2. With such a process, when a voltage of the first capacitor C1 is the same as that of the second capacitor C2, it is switched to a normal state and thus the thyristor Q1 is not conducted so that the OPEN state may be made between the reference point A and the neutral point B as shown in FIG. 6.

Referring to FIG. 8, when the voltage of the neutral point is greater than the voltage of the reference point, an output voltage of the differential amplification unit 51 becomes a negative value and the negative value is applied to the comparator U2 of the voltage imbalance detection unit 52 to exceed the negative reference value –REF so that an output of the comparator U2 becomes a LOW state to turn on the transistor Q4.

With such a process, a current is applied to a gate of the thyristor Q2 of the switching unit 40 and thus the thyristor Q2 is conducted so that a SHORT state is made between the reference point and the neutral point. At this point, the output of the comparator U1 of the voltage imbalance detection unit 52 is still maintained in the HIGH state so that the thyristor Q1 is not conducted.

Through a series of process, a current flows along a path of the second resistor R2, the neutral point B, the reference point A, and the second resistor R2 such that the voltage of the second capacitor C2 may be discharged. With such a process, when a voltage of the first capacitor C1 is the same as that of the second capacitor C2, it is switched to the normal state and thus the thyristor Q1 is not conducted so that the OPEN state may be made between the reference point A and the neutral point B as shown in FIG. 6.

As described above, the present disclosure is capable of maintaining a balance between voltages of capacitors of the smoothing unit 3 without using a voltage divider resistor at the smoothing unit 3 of an inverter so that a size of the inverter is reduced and an inverter manufacturing cost may be decreased.

Also, a designer may set a voltage difference between a neutral point and a reference point, which determines an operation of the balancing apparatus of the present disclosure, using reference values +REF and −REF of a voltage imbalance detection unit so that a variety of circuits may be designed as intended by the designer.

Further, in accordance with the present disclosure, a voltage imbalance is designed to be solved through hardware so that voltages at both ends of a capacitor of the smoothing unit 3 may be adjusted to be balanced without a time delay according to a software process when a voltage imbalance occurs at the smoothing unit 3.

The present disclosure has been described with reference to the embodiments shown in the drawings, but is merely an illustration, and it should be understood that numerous other modifications and equivalent other embodiments can be devised by those skilled in the art. Therefore, the technical scope of the present invention should be defined by the appended claims.

| [Description of Reference Numerals] | |
|---|---|
| 30: Voltage Measuring Capacitor | 40: Switching Unit |
| 50: Control Unit | 51: Differential Amplification Unit |
| 52: Voltage Imbalance Detection Unit | 53: Current Applying Unit |

What is claimed is:

1. An apparatus for balancing voltages applied to first and second capacitors in an inverter system including a smoothing unit configured with the first and second capacitors which are equivalently connected in series to each other, comprising:
    first and second resistors connected in series to each other, wherein the serial connection of the first and second resistors is connected in parallel to the smoothing unit;
    a switching unit connected to a node (a reference point) between the first and second resistors and a node (a neutral point) between the first and second capacitors and configured to short and open between the reference point and the neutral point;
    a control unit configured to control the switching unit to short between the reference point and the neutral point when a voltage of the reference point (a reference point voltage) and a voltage of the neutral point (a neutral point voltage) are different from each other; and
    a voltage measuring element connected between the reference point and the neutral point.

2. The apparatus of claim 1, wherein the switching unit includes first and second anti-parallel connected thyristors.

3. The apparatus of claim 2, wherein the control unit includes:
    an amplification unit configured to amplifying a difference between the reference point voltage and the neutral point voltage;
    a detection unit configured to detect an output voltage of the amplification unit over a first reference and a second reference which are in a predetermined rage; and
    an applying unit configured to apply a current controlling the switching unit according to an output of the detection unit.

4. The apparatus of claim 3, wherein the detection unit includes:
    a first comparator configured to enable the applying unit to apply a current to the switching unit when the output voltage of the amplification unit is greater than the first reference; and
    a second comparator configured to enable the applying unit to apply the current to the switching unit when the output voltage of the amplification unit is less than the second reference.

5. The apparatus of claim 1, resistance values of the first and second resistors are substantially the same to each other.

* * * * *